United States Patent
Reutelingsperger et al.

(10) Patent No.: US 10,422,075 B2
(45) Date of Patent: *Sep. 24, 2019

(54) METHOD TO PRODUCE A PILE TEXTILE PRODUCT AND A TEXTILE PRODUCT RESULTING FROM THE SAME

(71) Applicant: AGAIN IP B.V., Grubbenvorst (NL)

(72) Inventors: Christiaan Mathias Hubertus Gerard Reutelingsperger, Arcen (NL); Norbert Van Der Nap, Laren (NL)

(73) Assignee: AGAIN IP B.V., Grubbenvorst (NL)

( * ) Notice: Subject to any disclaimer, the term of this patent is extended or adjusted under 35 U.S.C. 154(b) by 6 days.

This patent is subject to a terminal disclaimer.

(21) Appl. No.: 15/956,939

(22) Filed: Apr. 19, 2018

(65) Prior Publication Data

US 2018/0237983 A1 Aug. 23, 2018

Related U.S. Application Data

(63) Continuation of application No. 14/752,860, filed on Jun. 27, 2015, now Pat. No. 10,017,899, which is a
(Continued)

(30) Foreign Application Priority Data

Dec. 6, 2010 (EP) .................................... 10193871

(51) Int. Cl.
*B29C 65/20* (2006.01)
*B32B 37/04* (2006.01)
(Continued)

(52) U.S. Cl.
CPC ........... *D06N 7/0065* (2013.01); *B29C 65/20* (2013.01); *B32B 5/02* (2013.01); *B32B 27/12* (2013.01);
(Continued)

(58) Field of Classification Search
CPC ......... B29C 65/20; B32B 37/04; B32B 37/06; B32B 37/10; B32B 38/004;
(Continued)

(56) References Cited

U.S. PATENT DOCUMENTS 3,616,137 A 10/1971 Morton
3,732,136 A 5/1973 Lord
(Continued)

FOREIGN PATENT DOCUMENTS

EP 1598476 A1 11/2005
EP 1705292 A1 9/2006
(Continued)

OTHER PUBLICATIONS

Toyo Linoleum KK, Tuft Carpet Production by Melt Adhesion of Back Stitches of Pile Yarn, Derwent, Apr. 22, 1976, XP-002353724.

*Primary Examiner* — Michael A Tolin
(74) *Attorney, Agent, or Firm* — Richard M. Goldberg (57) ABSTRACT

A method for manufacturing a textile product includes the steps of providing an intermediate product formed by a backing having a front surface and a back surface, and yarns applied into the backing, the yarns extending from the front surface of the backing material, feeding the intermediate product along a body having a heated surface, the back surface being pressed against the heated surface, to at least partly melt the yarns present in the intermediate product to form the textile product, wherein the part of the back surface that is pressed against the heated surface has a relative speed with respect to the heated surface, and a device enabling applications of this method and to a floor covering incorporating such a textile product connected to a dimensionally stable carrier sheet using thermo reversible covalent interactions.

11 Claims, 5 Drawing Sheets

Related U.S. Application Data continuation of application No. 13/990,588, filed as application No. PCT/EP2011/071081 on Nov. 25, 2011, now Pat. No. 9,096,047.

(51) Int. Cl.

| | | |
|---|---|---|
| *B32B 37/06* | (2006.01) | |
| *B32B 37/10* | (2006.01) | |
| *D05C 17/02* | (2006.01) | |
| *D06N 7/00* | (2006.01) | |
| *B32B 38/00* | (2006.01) | |
| *B32B 33/00* | (2006.01) | |
| *B32B 43/00* | (2006.01) | |
| *D04H 11/00* | (2006.01) | |
| *B32B 5/02* | (2006.01) | |
| *B32B 27/12* | (2006.01) | |

(52) U.S. Cl.
CPC .............. *B32B 33/00* (2013.01); *B32B 37/04* (2013.01); *B32B 37/06* (2013.01); *B32B 37/10* (2013.01); *B32B 38/004* (2013.01); *B32B 43/006* (2013.01); *D04H 11/00* (2013.01); *D05C 17/02* (2013.01); *D06N 7/0071* (2013.01); *B32B 2471/02* (2013.01); *Y10T 156/1153* (2015.01); *Y10T 156/17* (2015.01); *Y10T 428/23943* (2015.04); *Y10T 428/23986* (2015.04)

(58) Field of Classification Search
CPC .... B32B 2471/02; D04H 11/00; D05C 17/02; D06N 7/0063; D06N 7/0065; D06N 7/0071; Y10T 428/23979; Y10T 428/23986

See application file for complete search history.

(56) References Cited

U.S. PATENT DOCUMENTS

| | | |
|---|---|---|
| 4,624,878 A | 11/1986 | Evans et al. |
| 4,849,270 A | 7/1989 | Evans |
| 5,556,684 A | 9/1996 | Forero |
| 9,096,047 B2 * | 8/2015 | Reutelingsperger ......... D06N 7/0065 |
| 10,017,899 B2 * | 7/2018 | Reutelingsperger ......... D06N 7/0065 |
| 2002/0039636 A1 | 4/2002 | Fink |
| 2005/0284558 A1 | 12/2005 | Boerrigter |
| 2008/0044599 A1 | 2/2008 | Stroppiana |
| 2008/0095974 A1 | 4/2008 | Hoffe et al. |
| 2010/0260966 A1 | 10/2010 | McGill |

FOREIGN PATENT DOCUMENTS

| | | |
|---|---|---|
| EP | 1916330 A1 | 4/2008 |
| EP | 2172589 A1 | 4/2010 |
| GB | 1387231 A | 3/1975 |
| WO | 2006/034115 A2 | 3/2006 |
| WO | 2007/127222 A1 | 11/2007 |

* cited by examiner

METHOD TO PRODUCE A PILE TEXTILE PRODUCT AND A TEXTILE PRODUCT RESULTING FROM THE SAME

FIELD OF THE INVENTION

The present invention pertains to textile products, in particular floor coverings, such as carpet, carpet tiles, rugs and mats, and the manufacturing thereof. In particular, the invention pertains to textile products in which yarns are connected to a primary backing without the need of applying secondary backing. The invention also pertains to a method to recycle floor coverings.

BACKGROUND OF THE INVENTION

From EP 1 598 476 a method for manufacturing a textile product is known, the method comprising providing an intermediate product (i.e. a product in a form not suitable for end use such as object covering, floor covering, clothing etc.), comprising a backing having a front surface and a back surface, and yarns applied into the backing, the yarns extending from the front surface of the backing material, and feeding the intermediate product along a body having a heated surface, the back surface being pressed against the said heated surface, to at least partly melt the yarns present in the intermediate product to form the textile product. Thereafter, the textile product is cooled to normal room temperature such that the molten yarn material is solidified. With this method the yarns are properly anchored in the backing without needing a secondary backing of for example latex.

Latex based floor coverings have several disadvantages. Firstly, since the latex is water-based, latex coverings tend to be non-resistant to moisture. They may allow moisture to pass through which on its turn can lead to the formation of mildew and molds. This cannot only degrade the floor covering, but may also lead to environmental hazards such as poor air quality. As a consequence, when latex based floor coverings are placed in an area where moisture is a concern, for example in lobbies, they may need to be frequently replaced. Secondly, because latex-based floor coverings use dissimilar materials for the yarns, the backing and the adhesive, such coverings cannot be fully recycled. Carpet recycling technologies have been developed but are expensive and do not allow complete recycling of the materials used, mainly due to the intense embedding of the yarns and backing in the vulcanized latex. As a result, most floor coverings are simply discarded, burned or shredded. At best, shredded floor coverings are used as landfills but since vulcanized latex is hardly biodegradable, the shredded remains will be present for many years.

Alternatively the conventional latex is replaced by an adhesive consisting of synthetic polymers such as polyolefines and polyurethanes. This is for example known from US 2010/0260966, which discloses a carpet tile that includes a face fabric having a top surface and a base, and a dimensionally stabilized non-woven cushion material having a stabilizing material incorporated therein. The non-woven cushion material is attached to the face fabric by using a synthetic polymer adhesive, in which adhesive the cushion material as well as the fabric are embedded for adequate bonding. Still, complete recycling of this known carpet tile is hardly possible due to the embedding of the face fabric and the cushion material in the polymer.

Another solution proposed in the art is to use of hot melt adhesives. These adhesives are popular in conventional roll carpets since they are relatively inexpensive, readily available and can be recycled more easily. Hot melt adhesives are also used in carpet tiles, as is known for example from WO 2007/127222. Still, given the fact that the bonding of the face fabric with the backing when using a hot melt adhesive needs substantial embedding of the materials in this adhesive, complete recycling remains hard. Either the face fabric, the backing or both will inevitably be contaminated with substantial amounts of the adhesive.

Therefore, the method as known from EP 1 598 476 provides substantial advantages, not only with regard to recycling but also with regard to energy and raw material savings. However, the anchoring of the yarns into the backing is not strong enough for applications were the textile product is subjected to high mechanical loads such as in the interior of cars, trains, planes, offices, shops etc. That is why preferably a thermoplastic adhesive is applied to the back of the intermediate product before it is pressed against the heated surface for anchoring the yarns.

SUMMARY OF THE INVENTION

It is an object of the invention to provide a method to manufacture a textile product that overcomes or at least mitigates the disadvantages of the known method, and a device to enable application of this method. It is a further object of the invention to provide a floor covering comprising such a textile product, which floor covering is ideally suitable for recycling when worn. Another object of the invention is to provide a method to recycle such a floor covering.

To this end a method as described here-above and known from EP 1 598 476 has been devised, wherein the part of the back surface that is pressed against the heated surface has a relative speed with respect to the heated surface. In the prior art method (which method is also known from EP 1 916 330), the heated drum rotates in conjunction with the intermediate product, thus ensuring that the part of the back surface that is pressed against the heated surface has in essence the same speed as the said heated surface. This on its turn provides that there is no, or at least hardly any, mechanical disturbance of the placement of the yarns into the backing, in particular ensuring that the yarns are not pulled out of the backing. Indeed, in the intermediate product the yarns are simply weaved, knitted, stitched or other wise applied into the backing which means that they can be removed from the intermediate product by a light pulling force (e.g. manually). This is why in the art, the heated surface is rotated at exactly the same speed as the intermediate product that is fed in conjunction therewith.

Applicant surprisingly found that a substantially improved textile product can be obtained when there is a relative speed between the part of the back surface that is pressed against the heated surface and the heated surface itself. By enforcing a relative speed, i.e. a speed difference at macroscopic level (thus being more than the inherent microscopic speed difference that exists when two surfaces are driven in conjunction, thus at least being a difference of 1 centimetre/min, typically above 2, 3, 4, 5, 6, 7, 8, 9, 10, 11, 12, 13, 14, 15, 16, 17, 18, 19, preferably over 20 cm/min) an additional mechanical force is imposed that actually spreads the molten material of the yarns. Apparently, in a situation where the yarns are being melted at the back surface, such spreading forces do not pull the yarns out of the backing. The advantage of this spreading is not only that the anchoring is much stronger, thereby eliminating the need for the application of an additional adhesive, but also that the resulting back surface is substantially smoother than a back surface obtainable with the method as known from the art discussed here-above. This on its turn provides more freedom in applying the textile product. It is noted that the speed difference between the intermediate product and the heated body typically is in the range 10-100% (0% meaning no speed difference, 100% meaning that one surface stands still with respect to the other), preferably over 15, 20, 25, 30, 35, 40, 45, 50, 55, 60, 65, 70, 75, 80, 85, 90 or 95%. However at a very high throughput speed of the intermediate product, a relative speed difference below 10% could be sufficient. For example, at a throughput speed of the intermediate product of 40 m/min, an absolute speed difference of 2 m/min (5%) could be sufficient to impose an adequate mechanical spreading force. The same could be true in case the molten material has a very low viscosity.

The invention also pertains to a device that enables the application of the new method, the device comprising a means for feeding a backing having yarns applied therein (the backing being typically fed from a carrier, e.g. a core on which the backing is wound). Although the device could be provided with any body having a heated surface which body can be spatially controlled such that the backing is fed in contact with the heated surface at a relative speed with respect to that heated surface of the body, the device preferably comprises as a heated body a blade having an edge that can be heated above a temperature at which the yarns melt. The device further comprises a means for pressing the backing against the heated surface, in particular the edge of the heated blade, while being fed, and a means to further process the resulting textile product, for example by at least dimensioning the product (e.g. by cutting the product in separate lanes having a length of 20-50 meters). Although the known device using a heated drum to anchor the yarns can also be used to apply the method according to the invention, for example by securing the drum such that it cannot rotate at all, or rotate at a circumferential speed lower or higher than the speed at which the intermediate product is fed, applicant found that a device having a blade for heating the intermediate product is ideally suitable for applying the method according to the present invention. With a blade a very short contact time between the heated surface and the intermediate product can be achieved, which provides the opportunity to use in combination a relatively high temperature of the heated surface and high contact pressure. This on its turn may give a better spreading result of the molten material and thus a better anchoring of the yarns.

The new method did provide the insight that a textile product having yarns anchored to a backing and at the same time having a very smooth back surface (no matter how this product is made) can be ideally used to make a fully recyclable floor covering. To this end the textile product is connected with its back surface to a dimensionally stable carrier sheet, the textile product being connected to the sheet using thermo reversible covalent interactions. Applicant recognised that when a textile product is used wherein the yarns are mechanically anchored (e.g. by melting or reacting the yarns at the back surface of the textile product to provide sound mechanical connection between the ends of the yarns), an adhesive does not need to have the function of anchoring the yarns such as is the case with prior art latex based floor coverings. This allows the use of a different type of bonding when devising a floor covering which needs to be dimensionally stable. Prior art adhesive bonding is based entirely on Vanderwaals forces and friction. Given the fact that such interactions are relatively weak, a high degree of embedding of the yarns in the adhesive is necessary. In the present invention covalent interactions are used to connect the self-supporting textile product with the backing sheet. Covalent interactions are inherently very strong and need contact only on molecular level. Physical embedding may be applied but is not essential, or at least not to the extent as used in prior art floor coverings. This type of connection that does not, or at least to a lesser extent, rely on embedding of an adhesive in the face fabric, on its turn allows the use of a dimensionally stable, preferably also flexible, carrier sheet as a backing, for example a thin flexible sheet of an artificial or natural material (for example polypropylene or cork). The use of a separate self-supporting sheet, instead of a backing that is applied as a liquid coating and then hardened (vulcanized) in situ, on its turn allows to have no or hardly any contaminating adhesive to be present in the backing (i.e. the carrier sheet), which obviates recycling of the floor covering, in particular when using thermo reversible covalent interactions. Recycling then merely takes heating the floor covering until the textile product de-connects from the sheet, separating the textile product from the sheet, and reusing the textile product and the sheet, for example to produce a new floor covering according to the invention.

Definitions

Being flat: having a height substantially less than its width and length. A flat object may be substantially two dimensional as a whole but it may also be curved, rippled, rolled up etc.)

A backing: a substantially flat material, suitable for applying yarns to obtain a textile product with yarns that extend there from, typically used for manufacturing floor coverings but in embodiments applicable for manufacturing clothing, canvas for tents, household textile etc. The application of the yarns may be accomplished by any method such as for example tufting, knitting, weaving, sewing, stitching etc.

A floor covering: a textile product that can be used to cover objects such as floors (which term includes walls, ceilings etc.), furniture, the interior of cars, trains, boats, airplanes etc.

A blade: an elongated element, having a small width working surface (also called the edge), typically below 2 cm in width, preferably below 1.0, 0.9, 0.8, 0.7, 0.6, 0.5, or 0.4 cm, further preferably between 0.01 and 0.3 cm in width. A blade is typically operated while being non-rotating along its length-axis (as in contrast with a roller). A blade may be connected to another element such as a drum.

Melting: to heat above a temperature wherein the material becomes at least malleable, preferably reaching a state wherein the material can flow under mere gravitational forces (i.e. being liquid).

Self-supporting textile product a textile product of which the (major part of the) constituting yarns cannot be removed by simply pulling by hand. Typically, yarns tufted into a primary backing form a non-self-supporting textile product the yarns can be pulled out of the product by hand. Typically, after application of a secondary backing comprising e.g. latex, the yarns are mechanically bonded into the textile product to form a self-supporting textile product.

Dimensionally stable: having dimensions that do not noticeably change when being exposed to mechanical load (such as walking over it and other load typical for floor coverings) or variations in temperature and humidity.

Fibre-binding: a process wherein fibres (or yarns) are mechanically locked to a substrate, such that they cannot be removed by simply pulling by hand. Fibre-binding is also denoted as "yarn-binding" in this specification.

EMBODIMENTS OF THE INVENTION

In an embodiment the heated surface is an edge of a blade. In the art of melting yarns piled into a backing material using a heated surface, typically drums or rollers are used. A drum or roller is believed to have several advantages: 1) a smooth mechanical impact on the vulnerable textile product; 2) easy maintaining a constant temperature; 3) they can be used for driving and guiding the textile product; 4) they can easily be kept clean (using for example a doctor blade that scrapes the drum). In the art, blades are used when harsh mechanical impact is necessary: they are typically used for scraping, and act as a squeegee to gather an excess of liquid or semi-liquid material from a surface. This is typically not wanted in a situation were material is to be melted and not at the same time scraped off. However, applicant found that when using a blade, a better spreading result of the melted material can be obtained, without necessarily imposing too much mechanical impact on the intermediate product. If the same spreading result is to be obtained with a drum, a very high drum temperature is needed since the pressure can hardly be increased to a level as high as in a situation were a blade is used. This inherently means that there are restrictions to the type of material that can be applied. In particular those materials that would degrade at the required drum temperatures cannot be used. With a blade, lower temperatures can be used to obtain the same spreading result, or, due to the short contact time, at least the amount of heat transferred from the heated surface to the back surface of the intermediate product can be kept sufficiently low to avoid degrading of the materials used.

In an embodiment the intermediate product is fed between the blade and a rotating drum facing the blade. This way an adequate local pressure on the back surface of the intermediate product can be easily obtained without running the risk of the intermediate product to tear.

In another embodiment the blade is vibrated when pressed against the back surface. Surprisingly it has been found that contamination of the blade, in particular deposits of molten yarn or other material can be prevented when the blade is vibrated. This goes against the common knowledge that blades are typically used for scraping off liquid material and inherently building up a deposit of such material on the blade. The reason for this not, or at least to a far lesser extent, happening when the blade is vibrated is not clear, but certainly it eliminates or at least lessens the need for regular cleaning of the blade. This makes the process very attractive from both a technical as commercial point of view. In a further embodiment, the frequency of vibrating is between 5000 and 50000 Hz, for example in the ultrasonic range (above 20.000 Hz, typically between 30.000 and 40.000 Hz) wherein the amplitude is for example in the micrometer range, typically between 0.1 and 10 μm, for example between 1 and 5 μm. In an embodiment the direction of vibrating is parallel to the intermediate product, transverse to the direction of transport of the product along the blade.

In yet another embodiment the blade is thermally connected to a non-flat carrying element. A disadvantage of a blade in general is that its heat capacity is relatively low given its more or less flat constitution. This means that it may be difficult to keep a blade at a constant high temperature, in particular when being in constant contact with an object having a lower temperature. This embodiment mitigates this problem by thermally connecting the blade to a non-flat carrying element. Such an element inherently has (when a non-insulating material is chosen) a higher heat capacity and thus can be used to transfer heat to the blade to keep its temperature at the same level.

In another embodiment the back surface is preheated before being pressed against the heated surface of the body. By preheating the back surface (i.e. heating the surface at least above room temperature, typically up to at least 100° C., 90° C., 80° C., 70° C., 60° C., 50° C., 40° C., 30° C., 20° C., 10° C. or 5° C. below the melting temperature of the yarn material), two things can be achieved. Firstly, the temperature difference between the blade and the textile product will be decreased, thereby possibly preventing that the blade cools too much upon contact with the intermediate product. Although any amount of cooling could be compensated by heating, this would lead to a harder to control process. Secondly, by preheating the back surface, the to be molten material can be brought for example in a state wherein it nearly melts, thereby more or less guaranteeing that during the very short contact time with the blade, the required heat to actually melt the material can be put into the intermediate product during the time in which molten material at the back surface is in contact with the blade for spreading purposes. In a further embodiment the back surface is preheated by pressing a heated preheat surface against the back surface, the preheat surface preferably being a preheat drum or a preheat blade.

In yet another embodiment wherein the yarns extend through the backing (thus not alone extend at the face side, but also through the back surface), at least a part of the yarns that extends out of back surface is melted. In this embodiment at least a part of yarns that extend out of the back surface (typically a loop of a yarn) of the backing is melted. This may already provide for a sufficient mechanical locking of the yarns in the textile product. However, it is preferred that a part of the yarns that is present in the backing is at least partly melted. By melting the yarns that are actually in the backing, an even better bonding between the yarns and the material of the backing can be accomplished. This may lead to a better locking than for example melting solely a part of the yarns that extend from the back surface.

In an embodiment the backing comprises a thermoplastic material that co-melts with the yarns. In this embodiment a true bonding between the yarns and the backing material can be accomplished since the molten material of both components is mixed and thereafter cooled down to become one (either at molecular, microscopic or macroscopic level).

In yet another embodiment the backing is a non woven fibrous material. Such material has been found ideally suitable to apply the present invention. It has been shown that this way a very smooth (flat) back surface can be created and a very good anchoring of the yarns. This lead to a textile product having a very wide range of possible applications.

In an embodiment of the floor covering according to the invention, the covalent interactions are formed by a thermo reversible reaction between reactive molecules present at the interface between the textile product and the sheet. This embodiment allows the reversion of the covalent interactions by heating the floor covering. This greatly contributes to the ease of recycling the floor covering, which can be understood as follows. By reversing the reaction between the reactive molecules, the original connecting structure falls apart in multiple smaller molecules. Such smaller molecules can be removed far more easily from the textile product and the sheet than conventional adhesives which comprise long chain molecules. It is for example possible to simply solve the resulting small molecules in a mild solvent, and afterwards recover these molecules from the solvent using any art-known method. Also, the molecules may be recycled together with fibrous material of the textile product and/or material of the carrier sheet, for example by blending therein. It is noted that thermo reversible covalent interactions per se are commonly known in chemistry. Examples can be found among Michael reactions; nitroso dimerization reactions; cyclic anhydride reactions in which ester bonds are formed; reactions in which aliphatic ionene formation takes place; reactions in which urethane formation takes place; reactions in which azlactone-phenol adduct formation takes place etc. (see J. Macromol. Sci. Rev. Macromol. Chem. C33 (3), 1993, pp. 239-257).

In a further embodiment the reaction is between a first molecule comprising a conjugated diene group and a second molecule comprising a dienophile group. Such reactions between a conjugated diene and a dienophile are referred to as Diels-Alder reactions. The advantage of a Diels-Alder reaction is that thermo reversibility can take place at relatively low temperatures, which may enable to prevent physical and chemical damage to the face fabric and carrier sheet. It is noted that a conjugated diene is an acyclic hydrocarbon with a molecular structure containing two carbon-carbon double bonds separated by a single bond. The diene group may be part of a molecule that comprises atoms different from carbon and hydrogen. A dienophile is the alkene (carbon double bond) component of a reaction between an alkene and a diene. The dienophile group may also be part of a molecule that comprises atoms different from carbon and hydrogen.

In even a further embodiment the diene group is a furan (such as furfuryl), anthracene, thiophene or pyrrole, and the dienophile group is a maleimide, fumarate, maleate or alkyne. These groups have proven to be suitable for application in the present invention. It is noted that this embodiment does not exclude the use of different diene groups and/or different dienophile groups in one application.

In an embodiment the molecules are bound to the textile product and sheet by non-covalent bindings. This embodiment allows easy application of the reactive molecules at the interface between the back of the textile product and the carrier sheet. Also, the non-covalent connection between the molecules and the textile product/carrier sheet allow easy removal which is advantageous for recycling. However, the strength of the resulting connection in this embodiment depends largely on the type of binding between the reactive molecules and the textile product and sheet respectively, and thus may be less than required for some applications.

In a preferred embodiment therefore, the molecules are bound to the textile product and sheet by covalent bindings. In this embodiment, the complete chain of interactions going from the back of the textile product to the top of the carrier sheet is based on covalent bonds which gives rise to a very strong connection between the textile product and sheet, typically equalling prior art floor coverings that have to rely on physical embedding of the fabric and backing in an adhesive. The covalent binding of the molecules to the textile product and sheet can take place by using any art-known method that enables reacting the molecules to the constituting yarns and fibres of the textile product and the sheet. Such method may for example rely on the same thermo-reversible bond which takes placed between the reactive molecules themselves.

In an embodiment wherein the textile product comprises polymer yarns, at least part of the molecules are embedded in the yarns. Such embedding can for example be based on co-extrusion of the reactive molecules in the polymer, but may also by based on molecular engineering, such as devising a copolymer that has adequate properties to function as a yarn in a textile product, but has build-in blocks that are reactive (for example a diene or dienophile when aiming at a Diels-Alder reaction). Another option for embedding is surface modification, for example by molecularly attaching the required molecules (for example after glowing or otherwise preparing a surface for modification). Co-extrusion or other ways of spreading the reactive molecules throughout the polymer of the yarns (e.g. in a compounding process step that precedes actual extrusion) are preferred. This preference is not only based on simplicity, but also meets the demand of enabling easy recycling: when the reactive molecules already form part of the polymer, the polymer can be easy recycled while keeping the reactive molecules incorporated in its matrix.

In another embodiment, wherein the carrier sheet is formed from a polymer, at least part of the molecules are embedded in the sheet. This embodiment may comprise a sheet wherein the molecules are attached to the surface of a sheet, or corresponding to the embodiment described supra, may for example be based on co-extrusion of the reactive molecules in the polymer, or may be based on any form of molecular engineering. Also in this embodiment, co-extrusion or other ways of spreading the reactive molecules throughout the polymer of the sheet are preferred, for the same reasons.

In an embodiment wherein the self-supporting textile product comprises polymer yarns, the polymer fibres are melted together at a side facing the carrier sheet. Melting is an easy and reliable method to connect polymer yarns to each other in order to provide the self-supporting properties of the textile product. In a preferred embodiment, the polymer fibres are polyamide fibres, preferably aliphatic polyamide such as Nylon®.

In an embodiment the carrier sheet is in essence made from a thermoplastic polymer, preferably polypropylene. Polypropylene is a relatively cheap material, easy to recycle and above all very suitable to produce a flexible, dimensionally stable sheet from.

In other embodiments, the covering is carpet, a carpet tile, a rug or a mat.

Example 1 describes various fibre-binding experiments.

Example 2 describes various proof-of-principle experiments for manufacturing floor coverings.

DETAILED DESCRIPTION

Figure 1A:
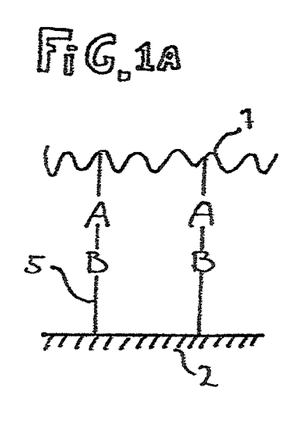
FIGS. 1A-1C schematically show molecular models of various connections between a face fabric and carrier sheet.
Figure 1B:
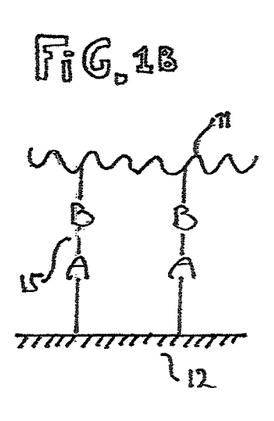
Figure 1C:
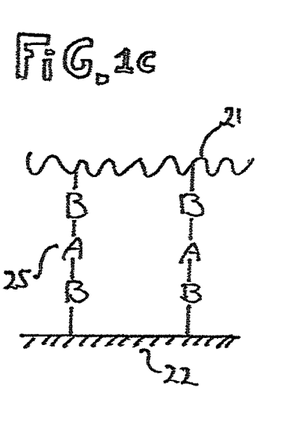

FIG. 1

In FIG. 1 some molecular models of various connections 5 between a textile product (1, 11, 21) and a carrier sheet (2, 12, 22) are depicted. In FIG. 1A reactive molecules A, in this case comprising diene groups, are integrated with the textile product 1, in this example by covalent binding to the self-supporting textile product 1. Reactive molecules B, in this case comprising dienophile groups, are covalently attached to carrier sheet 2. The molecules A and B have formed a thermo reversible Diels-Alder adduct.

In FIG. 1B another example is given wherein reactive molecules A and B are used. In this example, reactive molecules B are compounded in the polyamide polymer of which the yarns of textile product 11 are constituted. The same way, reactive molecules A are compounded in the polypropylene polymer of which sheet 12 is made. Both components are connected through reaction between molecules A and B to form connection 15. In FIG. 1C, reactive molecules B are coated on the back side of textile product 21 and on the front side of sheet 22. The textile product and the sheet are sandwiched with an intermediate layer of reactive molecules A in between. After the reaction between molecules A and B has taken place, a connection 25 using the covalent interactions between reacted molecules A and B is in place. In order to provide sufficient integral bonding strength in the example of FIG. 1C, the surfaces of the textile product 21 and sheet 22 are activated using a glow-discharge process.

Figure 2:
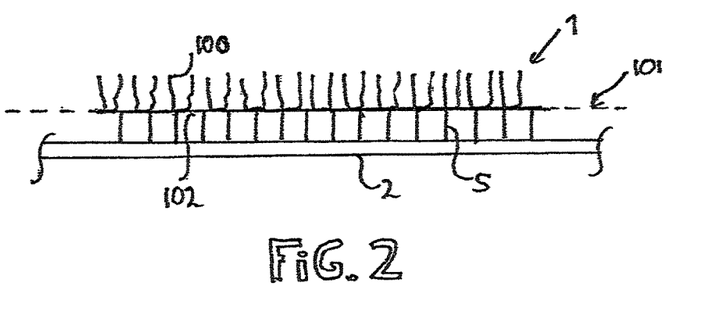
FIG. 2 schematically shows the cross section of a floor covering according to the invention.

FIG. 2

FIG. 2 schematically shows the cross section of a floor covering according to the invention. This covering comprises carrier sheet 2 to which is bonded textile product 1. This textile product is constituted of polyamide primary backing 101 and polyamide yarns 100. The yarns and the backing are melted together to form layer 102 that provides secure mechanical locking of the yarns to the backing, this way providing a self-supporting textile product 1 (viz. a product wherein the fibres are mechanically interlocked as opposed to a backing wherein the fibres/yarns are simply applied without actually locking them, leading to easy removability of the fibres/yarns upon a simple pulling force by hand). This self-supporting textile product is connected to sheet 2 by having bonds 5 (see FIG. 1A) in place.

Figure 3:
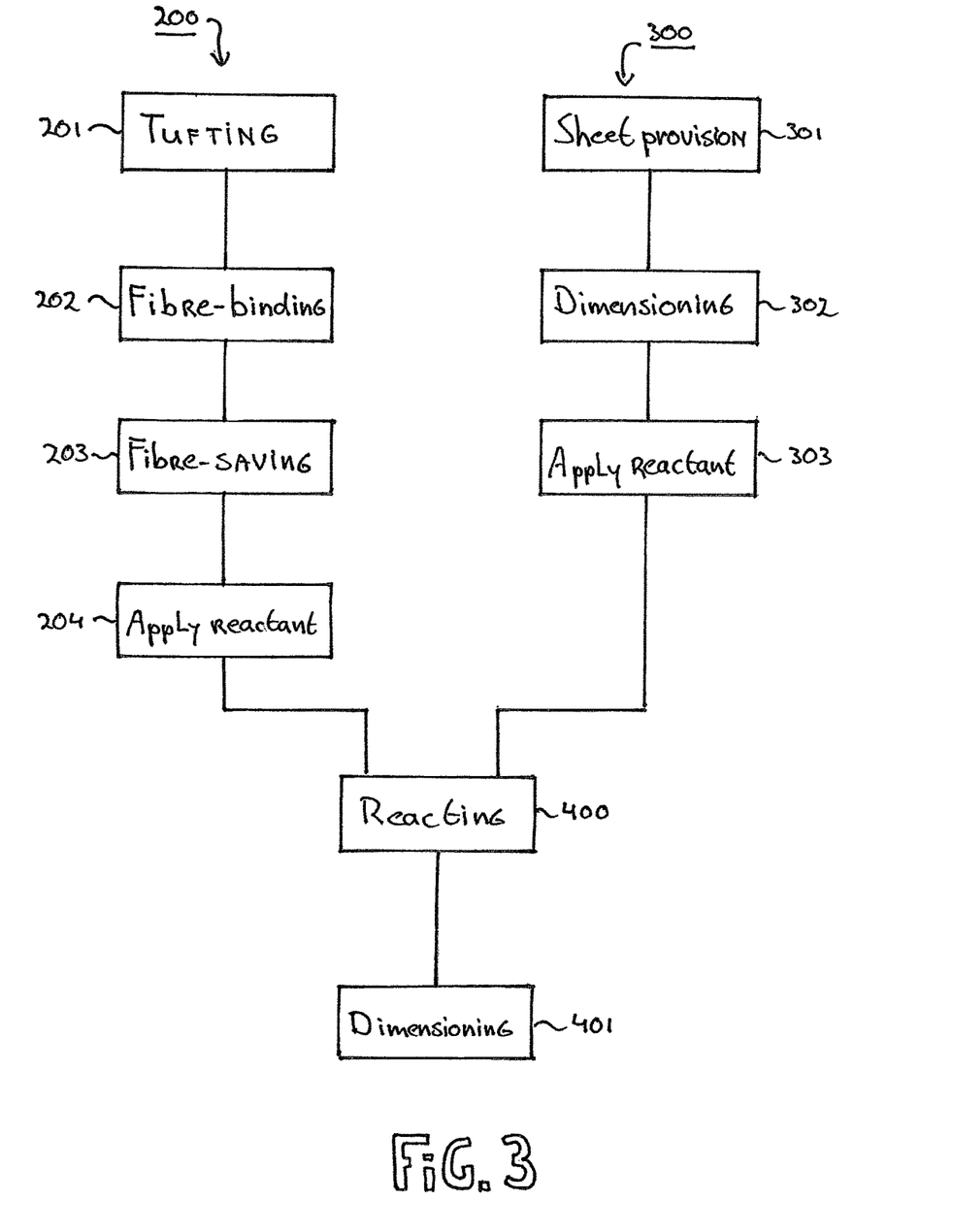
FIG. 3 diagrammatically shows a process to manufacture a floor covering according to FIG. 2.

FIG. 3

FIG. 3 diagrammatically shows a process to manufacture a floor covering according to FIG. 2. The process is initially comprised of two separate (semi-)continues processes 200 and 300. Sub-process 200 is the process wherein the self-supporting textile product is made to be ready for connection to a carrier sheet. Process 300 is the sub-process for preparing the carrier sheet.

In step 201 tufting of polyamide yarns in a polyamide backing takes place. The backing in this case is a continuous backing with a width of approximately 4 meters. The tufted fabric is transported to an operating station where the fibre (yarn) binding process 202 takes place. In this embodiment a hot metal blade (knife) is transported under pressure over the back side of the tufted fabric, which leads to the melting of the ends of the polyamide yarns and part of the polyamide backing, and thus a stable interconnection between these yarns and the backing (thus leading to a self-supporting textile product). A further advantage of this yarn binding process is that the backside of the tufted fabric becomes more flat, ultimately providing a good contact surface for connecting the carrier sheet to the fabric. In a next step 203 (the fibre saving step) the self-supporting textile product is led under stretch over a hot roller, such that the yarns are pushed into the direction of the face side of the product. This process leads to a higher pole, or when a predetermined standard pole is created, a saving of about 5-10% of yarn length. In the last step of sub-process 204 a compound comprising reactive molecules A is applied to the back side of the self-supporting textile product.

Parallel to sub-process 200, sub-process 300 is performed. In a first step 301, a sheet is provided, in this case by unwinding a polymer sheet, approximately 4.5 meters in width with a weight of 30 $g/m^2$, from a roll. In this embodiment, in step 302 the sheet is dimensioned by cutting the edges such that the sheet has the same width as the ultimate face fabric that comes out of process 204. In step 302 a compound comprising reactive molecules B is applied to the top surface of the sheet.

After this, the self-supporting textile product and the carrier sheet are brought together under circumstances wherein the molecules A and B react to form covalent bonds (reacting step 400). In this embodiment, the resulting floor covering is dimensioned to form carpet tiles in dimensioning step 401.

Figure 4:
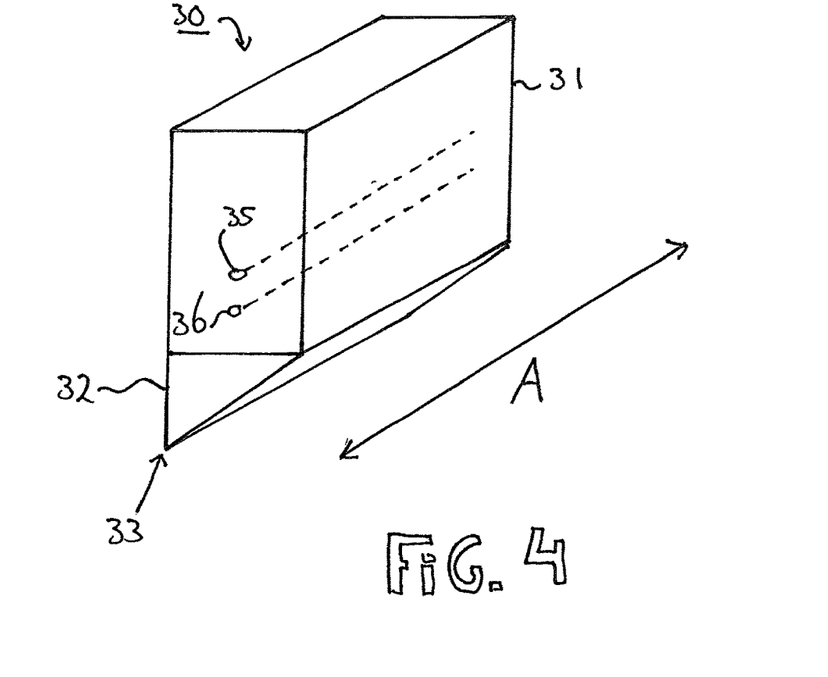
FIG. 4 schematically shows a blade for melting yarns present in an intermediate product.

FIG. 4

FIG. 4 schematically shows a blade 30 for melting yarns present in an intermediate product. This blade basically consists of an aluminum body with a length of approximately 210 mm (suitable for providing a textile product with a width of 210 mm; in practice an operating width of up to 4-6 meters is foreseen, typically obtained with multiple smaller length blades). The upper part 31 of the blade has a width of 25 mm. The lower part 32 converges to form a tip 33. Part 32 is coated with an anti-stick coating, in this case a PTFE (polytetrafluoro-ethylene) coating. The upper part is provided with internal heating elements 35 and 36, which elements are available under the tradename FAK, from Ihne&Tesch GmbH, Nurnberg, Germany. These elements have a capacity of 600 watt in total and are able to evenly heat the blade up to about 450° C. The temperature is controlled using a Fe—CuNi temperature sensor (not shown). The blade can be vibrated in the direction A, i.e. in a direction parallel to the length of the blade. The typical vibration frequency is 7000 Hz, although higher frequencies, for example between 30.000 and 40.000 Hz may provide better results with regard to preventing molten material to be deposited on the blade. The used amplitude is between 1-5 µm, typically around 2-3 µm.

Figure 5:
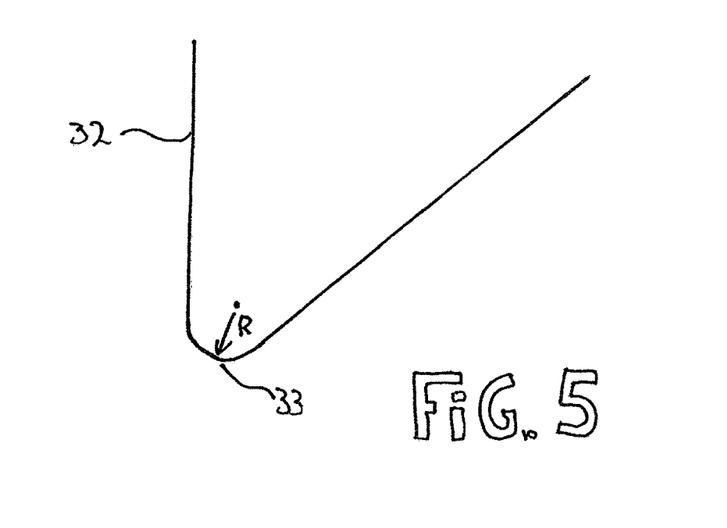
FIG. 5 shows a detail of the blade of FIG. 4.

FIG. 5

FIG. 5 shows a detail of the blade of FIG. 4. In this figure the lower part 32 of the blade is shown, ending in tip 33. This tip has a radius of 1 mm. Depending on the flexibility of the textile product, this results in a blade working surface of about 1 mm.

Figure 6:
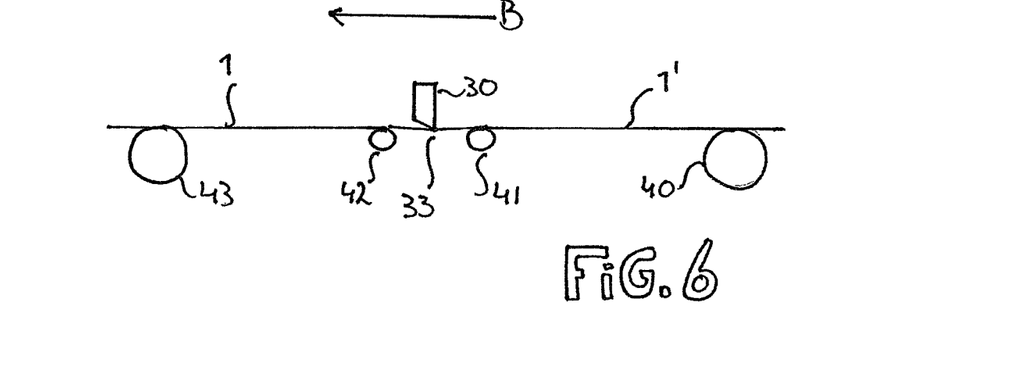
FIG. 6 schematically shows the positioning of the blade according to FIG. 4 for producing a self-supporting textile product.

FIG. 6

FIG. 6 schematically shows the positioning of the blade 30 according to FIG. 4 for producing a self-supporting textile product. In this arrangement, an intermediate product 1' is guided along roller 40 and 41 in the shown direction B (transverse to direction A as depicted in FIG. 4) to reach heated blade 30. The tip 33 of the blade 30 is pressed against the back of the intermediate product 1'. This way the piles, i.e. at least their parts adjacent the back surface of the intermediate product 1', are melted and the melted material is spread to become substantially flat. Thereafter the product cools down thereby mechanically binding the piles into the product to become textile product 1, which product is guided along rollers 42 and 43. The process of 1) at least partly melting the fibres of the piles, 2) spreading the molten material and 3) cooling down the molten material to below its solidification temperature is a fibre binding process in the sense of the present invention.

Figure 7:
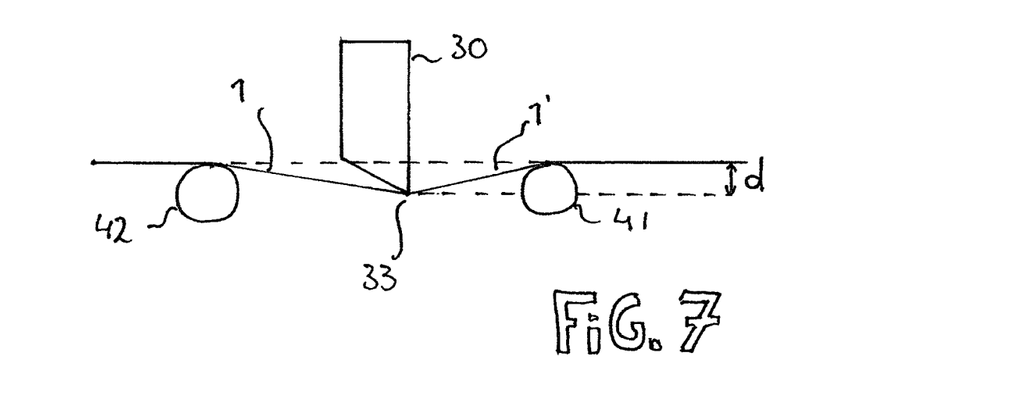
FIG. 7 shows a detail of the positioning of the blade according to FIG. 6.

FIG. 7

FIG. 7 shows a detail of the positioning of the blade according to FIG. 6. As shown in FIG. 7, the blade 30 is positioned at a certain depth with regard to the transport plane of product 1. This depth "d" is adjustable between 0 and 50 mm. By increasing the depth above 0, the blade is actually pressed against the back of the product (which mechanically is the same as pressing the product against the blade). The depth needed depends on the melting and spreading result desired, the temperature of the blade and the type of intermediate product (some products can withstand a higher pressure than others). As understood, if an intermediate product can not withstand a very high depth, for example only 3 mm, then with a certain temperature of the blade, the speed of the product can be adapted (lowered when the spreading result is insufficient, increased when the intermediate product is molten to a too high degree). The other way around, at a certain transport speed and blade temperature, one can alter the depth "d" until a desired spreading result is obtained. If the product tears (given a too high pressure of the blade on the intermediate product) before a desired result is obtained, the transport speed can be lowered and/or the blade temperature can be increased. Many more variations are within the reach of the skilled person.

Figure 8:
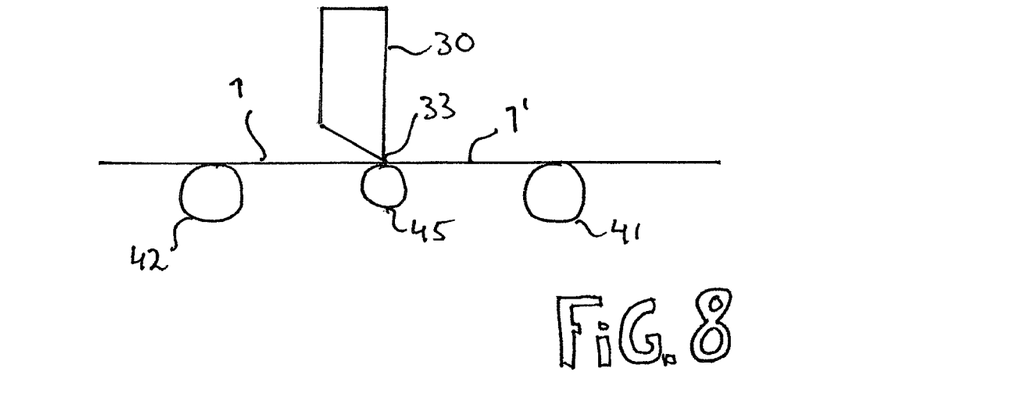
FIG. 8 depicts an alternative arrangement of the arrangement shown in FIG. 7.
Figure 9A:
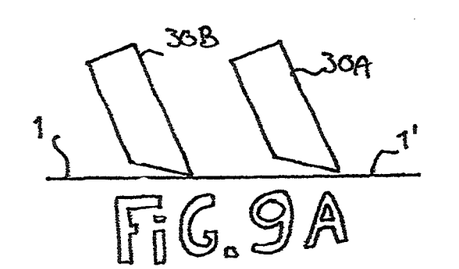
FIGS. 9A-9C schematically show various arrangements with two heated surfaces.
Figure 9B:
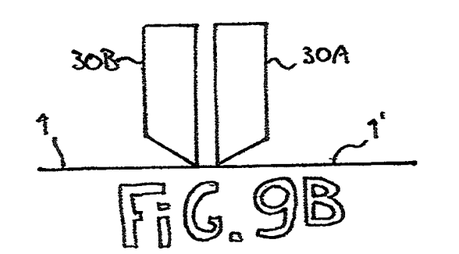
Figure 9C:
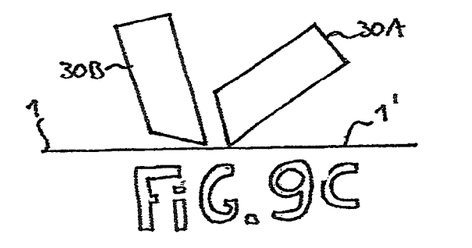
Figure 9D:
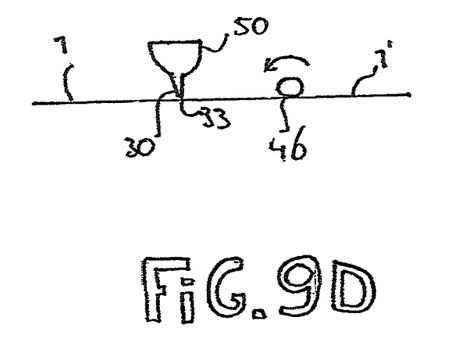

FIG. 8

FIG. 8 depicts an alternative arrangement of the arrangement shown in FIG. 7. In this alternative arrangement the intermediate product 1' is fed between blade 30 and a roller 45. This way the ultimate pressure with which the blade is pressed against the back surface of the intermediate product can be increased, while at the same time decreasing the risk of tearing of the product while subjected to the heat treatment and pressure of the blade.

FIG. 9

FIG. 9, having the sub-FIGS. 9A, 9B, 9C and 9D schematically shows various arrangements with two heated surfaces. The FIGS. 9A, 9B and 9C concern arrangements with two heated blades. In such two-blade arrangements the first blade 30A can be used to effectively increase the temperature of the intermediate product 1' and optionally achieve a preliminary fibre binding result. The second blade 30B can be used to provide the finishing fibre binding, that is the complete melting of the yarns as desired and spreading of the molten material to obtain a substantially flat back surface, with the fibres being actually mechanically locked into the textile product 1. In the arrangement shown in FIG. 9D, the first heated surface is a contact roller 46 which rolls in conjunction with the intermediate product 1'. In essence there is no speed difference between the surface of roller 46 and the part of the back surface of product 1' that is pressed against the roller. The ultimate fibre-binding takes place by the provision of blade 30, which in this constitution exists of a flat blade with a working surface 33. The blade is connected to a semi-spherical body 50 which serves as a heat capacitor.

EXAMPLE 1

Three intermediate products 1' were made to be subjected to a fibre-binding process according to the invention. These products are described in Table 1. All three products were based on non woven primary backings available from Freudenberg, Weinheim, Germany under the tradename Lutradur™, viz. Lutradur T6412 and Lutradur eco respectively. Two different types of yarns were used. The first yarn was PA6/2600/240/RDD/du of Aquafil, Arco (TN), Italy, which yarn has an uncompressed yarns thickness of about 1 mm. The second one was a yarn made from recycled PET, obtainable from Pharr Yarn, Mc Adenville, N.C., USA, which yarn has an uncompressed yarn thickness of 1.3 mm. It is noted that the latter yarn is indicated to be a "polyester" yarn by the manufacturer. The yarns were applied to the backings by forming loops at the back of the backing material, while at the same time extending through this backing to form piles at the front surface. Two cut piles as well as one loop pile intermediate product were made as indicated in Table 1. The resulting intermediate products had thicknesses of 8, 6.5 and 12 mm respectively.

TABLE 1

Intermediate products 1'A, 1'B and 1'C

| | Intermediate product 1' | | |
|---|---|---|---|
| | 1' A | 1' B | 1' C |
| backing | Lutradur T6412 | Lutradur T6412 | Lutradur eco |
| polymer | polypropylene | polypropylene | polyester |
| thickness backing | 0.5 mm | 0.5 mm | 0.5 mm |
| weight backing | ±115 g/m2 | ±115 g/m2 | ±115 g/m2 |
| melt temperature backing | 295° C. | 295° C. | 295° C. |
| yarn material | PA6 | PA6 | PET |
| height of the piles when stretched | 6 mm | 5 mm | 15 mm |
| type of pile | cut pile | loop pile | cut pile |
| melt temperature yarns | 250° C. | 250° C. | 280° C. |
| weight product (backing + yarns) | 870 g/m2 | 750 g/m2 | 1.400 g/m2 |
| thickness product | 8 mm | 6.5 mm | 12 mm |

These three intermediate products 1' were subjected to a fibre-binding process using the arrangement of FIG. 4. The blade temperature was 300° C., the depth "d" of the blade was about 10 mm (such that the intermediate products were compressed to have a thickness at the blade of about 2-3 mm in total) and the transport speed (direction B) was 0.2 m/min. The vibrating frequency of the blade was 7 kHz, with an amplitude of about 2 μm. With this set-up the yarns of the piles could be mechanically bonded into the textile product, while at the same time a very flat back surface was provided.

The resulting thicknesses of the self-supporting textile products was 5 mm, 5 mm and 10 mm for the resulting self supporting products 1 A, 1 B and 1 C respectively (see Table 2), indicating that the textile products were substantially flattened with respect to the intermediate products (without interfering with the pile heights). The reduction in thickness by the fibre-binding process is mainly due to the spreading of the loops of yarns at the back of the textile product. However, also part of the non woven backing is believed to be molten, pressed together and spread together with the molten yarn material (since none of the backing material fibres could be removed by hand at the sides of the resting products). The resulting flat surface of the textile product enables direct application of any of the products on a floor or any other article (such as the interior of a car or plane), or for example on a flexible, dimensionally stable sheet to form a carpet or carpet tile.

TABLE 2

Textile products 1A, 1B and 1C

| | Textile product 1 | | |
|---|---|---|---|
| | 1 A | 1 B | 1 C |
| thickness of the end product | 5 mm | 5 mm | 10 mm |
| thickness reduction due to fibre binding | 3 mm | 1.5 mm | 2 mm |

In this example the polymer materials used for the yarns and backing are polyamide 6, polyester, polypropylene and polyethylene terephtalate, but other materials may also be used, depending on the desired properties of the textile product. Other suitable polymer materials are for example other types of polyamide (PA 6.6), polyethyltrimethylene, biodegradable polymers based on lactic acid etc.

It is noted that to reach a transport speed of 20 m/min or higher, it is estimated that the blade should have a temperature of between 600-700° C., depending mainly on the type of backing (in particular woven or non-woven), the materials used for the pile yarns as well as the backing, and the desired flatness of the back side of the textile product. For such high temperatures a suitable non-stick coating would for example be a silicon oxide hybrid sol-gel coating as offered by Schaepman, Kampen, The Netherlands.

EXAMPLE 2

In a first experiment the principle is shown that a self-supporting textile product can be thermo reversibly bound to a dimensionally stable carrier material using a diene and dienophile as reactive molecules, leading to thermo reversible covalent interactions. For this, a commercially available maleimide coated glass slide (Xenopore, MSP 000 10; available from Xenopore, Hawthorne, N.J., USA) was used. The textile product was a fabric of polyamide fibres tufted in a polypropylene woven fabric. The fabric was made self-supporting by melting the backside with a little flame, sufficient to fixate the individual filaments in their yarn. The additional reactive molecules were comprised in a mixture of butyl-methacrylate (85 molecular percent) and furfuryl-methacrylate (15 molecular percent).

This mixture was spread out over the glass slide (0.44 grams on a slide weighing 4.66 gram; which is believed to be an excess of reactive mixture) and warmed in an oven at 175° C. for 2 minutes. After melting and spreading of the mixture over the slide, the self-supporting fabric (2.27 grams) was brought in contact with the glass slide and kept in the oven at 175° C. for 2 minutes with a pre warmed weight (1 kg) on top of it to ensure good interaction between the glass slide and the fabric. After 5 minutes, the slide was cooled down to room temperature and the connection between the carrier and the self-supporting fabric was evaluated. A firm connection of tufted fabric and glass slide was observed. It appeared to be impossible to remove the tufted fabric from the glass slide by manual forces. Attempts to pull out individual polyamide fibres from the face fabric also failed.

To show thermo reversibility of the connection, the construction was returned to the oven at temperature of 175° C. and warmed for 3 minutes. After this, the self-supporting fabric could be easily removed from the glass slide. The procedure of connection/disconnection of the fabric to the carrier was successfully repeated two times, which shows the thermo reversibility of the chemical bonding system.

In a second experiment other reactive molecules were used, viz. 85 molecular percent butyl-acrylate, 3 molecular percent acrylic acid and 12 molecular percent furfuryl methacrylate; to this composition a stoichiometric amount of 4,4-bis(maleinimido)diphenylmethane was added for internal polymer cross linking in competition with the connection to the carrier slide. The rest of the experimental set up was identical to the first experiment (although the fabric weighed slightly less, 1.91 grams). The thermo reversible connection was the same as observed in the first experiment.

The invention claimed is:

1. A method for manufacturing a carpet comprising the steps of:
    providing an intermediate product comprising a backing having a front surface and a back surface, and yarns applied into the backing, the yarns extending from the front surface of the backing material,
    feeding the intermediate product along a body having a heated surface, the back surface being pressed against the heated surface, to at least partly melt the yarns present in the intermediate product to form the carpet, and
    providing a relative speed of the part of the back surface that is pressed against the heated surface with respect to the heated surface.

2. A method according to claim 1, wherein the heated surface is an edge of a blade.

3. A method according to claim 2, wherein the step of feeding includes the step of feeding the intermediate product between the blade and a rotating drum facing the blade.

4. A method according to claim 2, further including the step of vibrating the blade when pressed against the back surface.

5. A method according to claim 4, wherein the frequency of vibrating is between 5000 and 50000 Hz.

6. A method according to claim 2, further comprising the step of thermally connecting the blade to a non-flat carrying element.

7. A method according to claim 1, further comprising the step of preheating the back surface before being pressed against the heated surface of the body.

8. A method according to claim 7, wherein the step of preheating includes the step of preheating the back surface by pressing a heated preheat surface against the back surface, the preheat surface being one of:
    a preheat drum and
    a preheat blade.

9. A method according to claim 1, wherein the yarns extend through the backing, and further comprising the step of melting at least a part of the yarns that extends out of the back surface.

10. A method according to claim 9, further comprising the step of at least partially melting a part of the yarns applied into the backing.

11. A method according to claim 1, wherein the backing is a non woven fibrous material.

* * * * *